United States Patent [19]

Byrne

[11] Patent Number: 4,759,467
[45] Date of Patent: Jul. 26, 1988

[54] DISPOSABLE COOLER LINER

[76] Inventor: Thomas R. Byrne, 10231 Bayou Cir., Fairhope, Ala. 36532

[21] Appl. No.: 107,271

[22] Filed: Oct. 13, 1987

[51] Int. Cl.$^4$ ............................................. B65D 5/36
[52] U.S. Cl. .................................. 220/404; 220/22; 383/38
[58] Field of Search ................... 220/404; 383/38, 39, 383/40; 220/404, 403, 22; 383/38

[56] References Cited

U.S. PATENT DOCUMENTS

| | | | |
|---|---|---|---|
| 1,911,871 | 1/1934 | Struve | 220/651 |
| 2,416,816 | 3/1947 | Campagnano | 383/38 |
| 3,614,875 | 10/1971 | McCallum | 62/372 |
| 4,299,324 | 11/1981 | Dickens | 383/38 X |
| 4,307,581 | 12/1981 | Reid | 62/457 |
| 4,428,484 | 1/1984 | Rattay et al. | 383/38 X |
| 4,542,826 | 9/1985 | Adams | 383/38 X |
| 4,558,801 | 12/1985 | Vilutis | 220/470 |
| 4,575,871 | 3/1986 | Auerbach et al. | 2/6 |

FOREIGN PATENT DOCUMENTS 190385   7/1985   European Pat. Off. ............. 383/36

Primary Examiner—Steven M. Pollard

[57] ABSTRACT

A disposable liner for a rigid chest for containing food, ice, water, or the like, made of flexible impermeable material and provided with a means of attachment to the inner walls of the chest, said liner containing any number of water impermeable walls providing separation of contents and cleanliness, and said liner being provided with a means of closure to insure a more sanitary disposal after use.

1 Claim, 3 Drawing Sheets

DISPOSABLE COOLER LINER

BACKGROUND OF THE INVENTION

The most common container used in todays society for keeping food, beverages, fish or fowl from spoiling while outdoors is a rigid insulated cooler. Sportsmen and picknickers generally use ice in block or crushed form to keep the contents cold, for this is its basic purpose.

Several problems are generally encountered when using this method. First, if the rigid cooler is not clean prior to placement of contents, an undesirable atmosphere is used for storage. Second, it needs to be kept clean while in use. Third, upon placement of ice in the cooler, the ice begins to melt into a liquid. This liquid is then free to move about the cooler around the contents allowing the water to come in contact with them. Fourth, if one is using the cooler for fishing or hunting, any meat stored in the cooler is able to intermingle with the food and/or beverages. This can lead to unpleasant conditions both through asthetics and taste. Fifth, after the cooler and contents are brought back for further use or disposal, a dirty cooler is left behind, requiring cleaning before storage or the next use.

OBJECTS AND SUMMARY OF THE INVENTION

Accordingly, the focus of this invention is to eliminate the above problems by providing a new and novel liner for the rigid cooler being used.

Prior art has yielded inserts for containers which are rigid in nature themselves, bulky, and taking up needed storage space for contents, while still not providing a water-free atmosphere.

The primary object of this invention is to provide a clean environment in which to place the contents, regardless of what condition of cleanliness the cooler is in.

Another object of this invention is to provide separation of contents through use of a novel inner wall or walls. Depending on the application for the liner being manufactured, these walls may or may not be incorporated in the design. However, if used, these will basically provide two (2) or more coolers in one (1). This will allow total separation of ice and liquid from food; or fish and game from ice and food in any combination, thus, keeping the contents separated and clean which is its greatest advantage.

Still another object of this invention is to provide an extra wall of clean insulation without sacrificing valuable space inside the cooler.

Still another object of this invention is to provide attachment of the liner to the inside walls of the cooler by use of an adhesive.

Still another object of this invention is to provide sanitary disposal of the liner after use, which can be accomplished in a variety of ways. Two (2) of which are closing of the open top of the liner using a draw string, or using a twist tie for convenient closure.

The final advantage of this invention over prior art provides a clean atmosphere for the next outing through use of an inexpensive, disposable liner.

The above objects and advantages of this invention over prior art will become more apparent through reference of the following description with the accompanying drawings.

DESCRIPTION OF THE PREFERRED EMBODIMENT

Figure 1A:
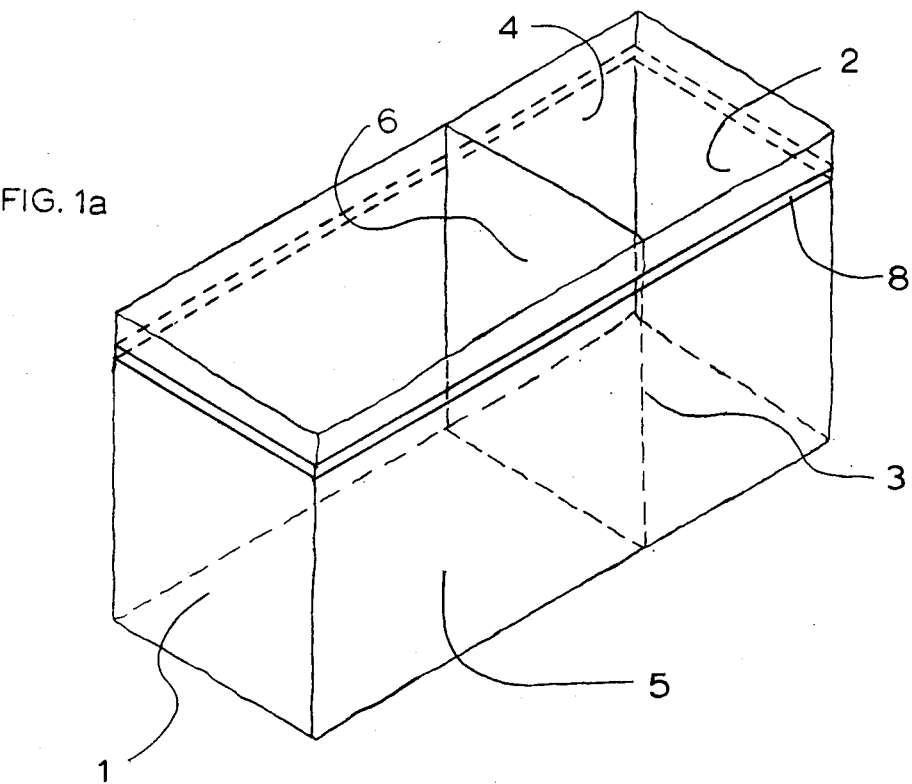
FIGS. 1a and 1b show perspective views of the liner constructed in accordance with the invention.
Figure 1B:
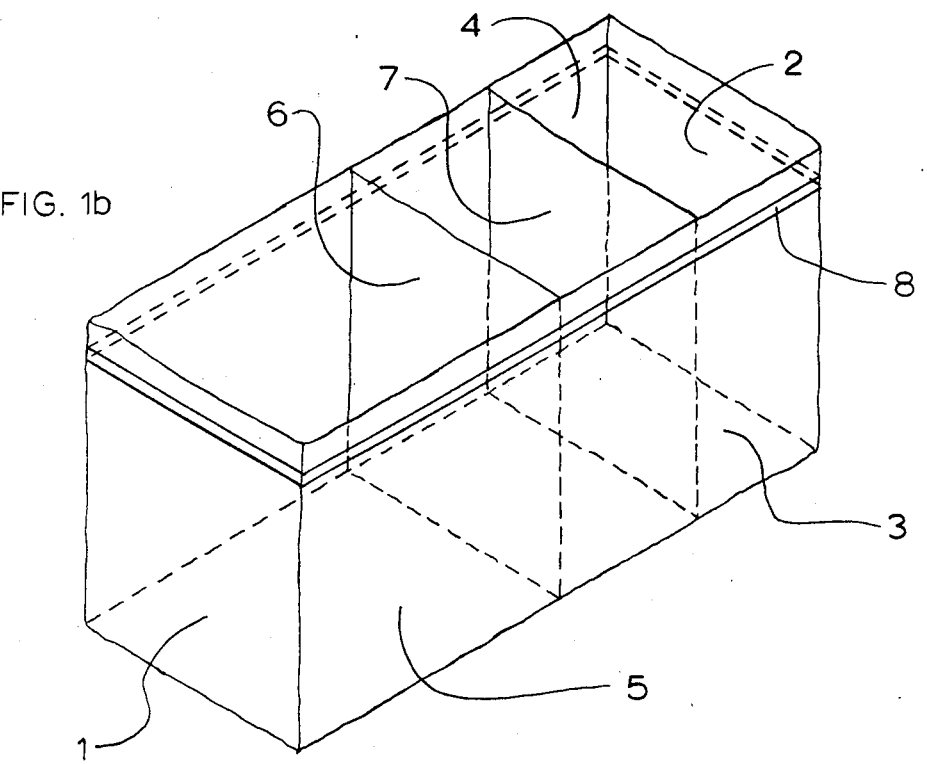

Referring now to the drawings and, in particular, FIG. 1, a liner is shown constructed in accordance with the invention.

Figure 4:
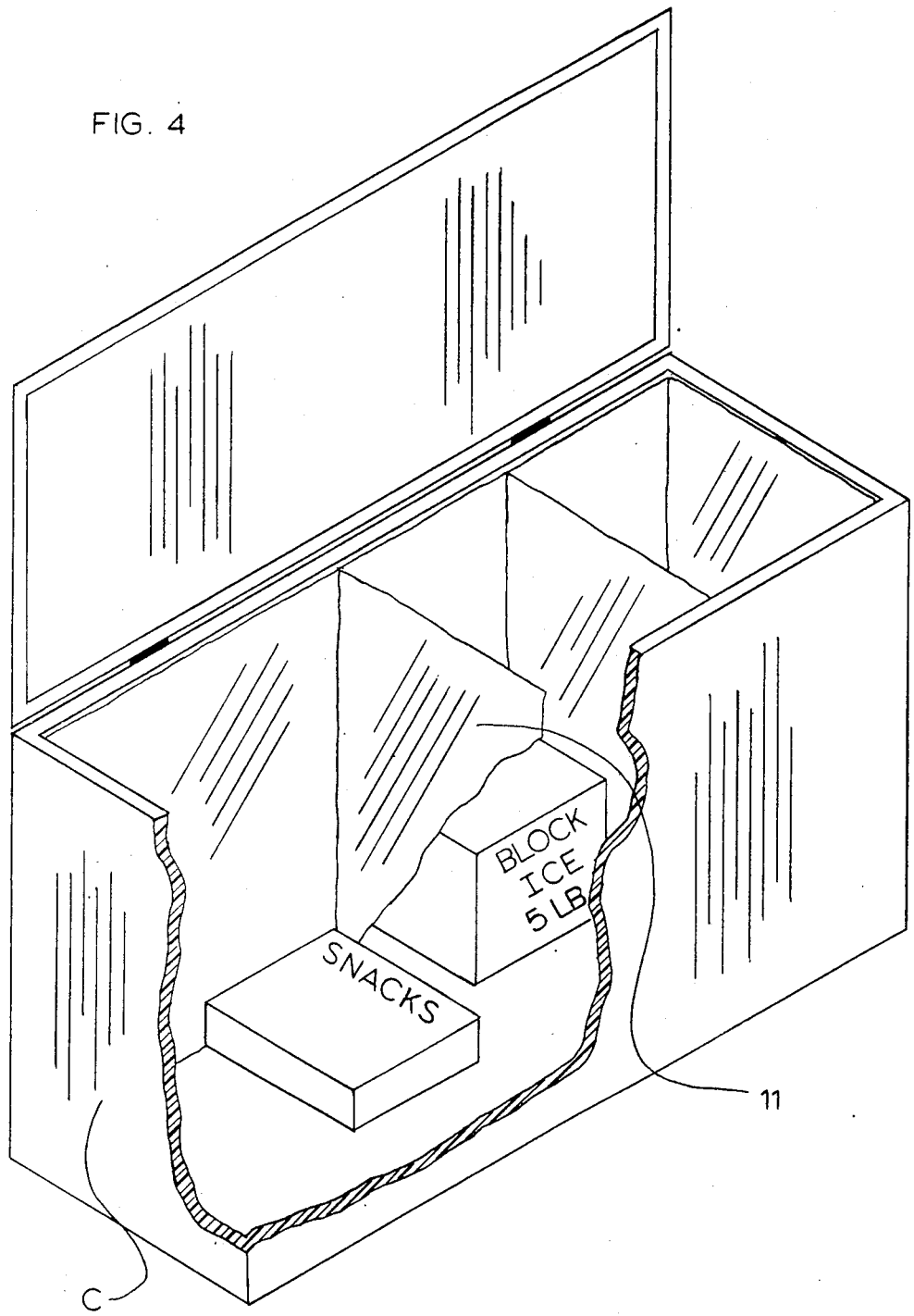
FIG. 4 is a perspective view of the liner shown in a rigid cooler with a cutaway section in the front displaying contents.

Likewise, in FIG. 4, an insulated cooler body designated by the letter "C" is utilized to illustrate the liner 11, in a usable position within the cooler.

In FIG. 1, the liner of the invention formed from a flexible, impervious material uses seal lines joined together at opposing edges to provide a rectangular area consisting of oppositely disposed end walls 1, 2 and oppositely disposed side walls 3, 4, combined with a lower bottom 5, defining an interior volume.

Means are shown to provide support of vertical walls 1, 2, 3, 4, through use of an adhesive 8 attached to the outside of said liner walls. It is further shown two (2) interior walls 6, 7, spaced within the liner, connecting at opposing edges vertical walls 3, 4, and bottom end 5 forming the separate internal storage compartments. The interior walls 6, 7 may or may not be manufactured as a part of the liner. The purpose of use will determine whether they're desired or not.

Figure 2:
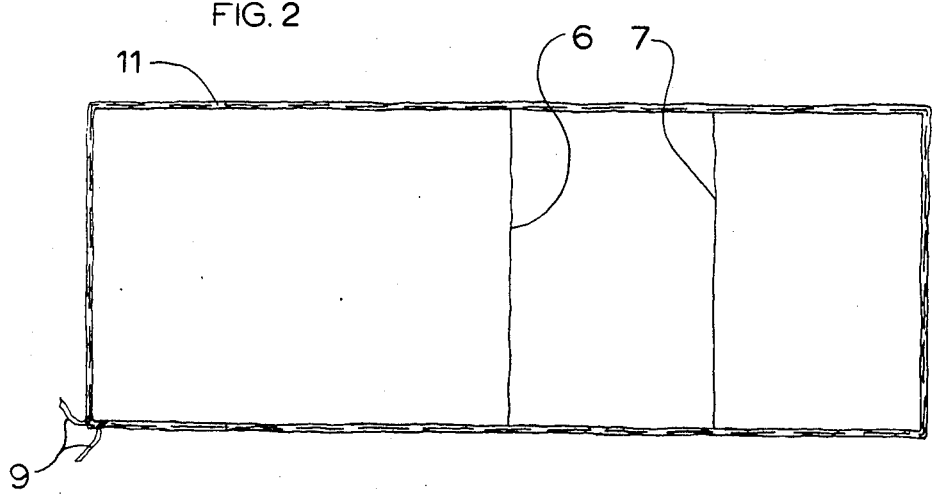
FIG. 2 is a plan view of the liner as viewed from the top.
Figure 3:
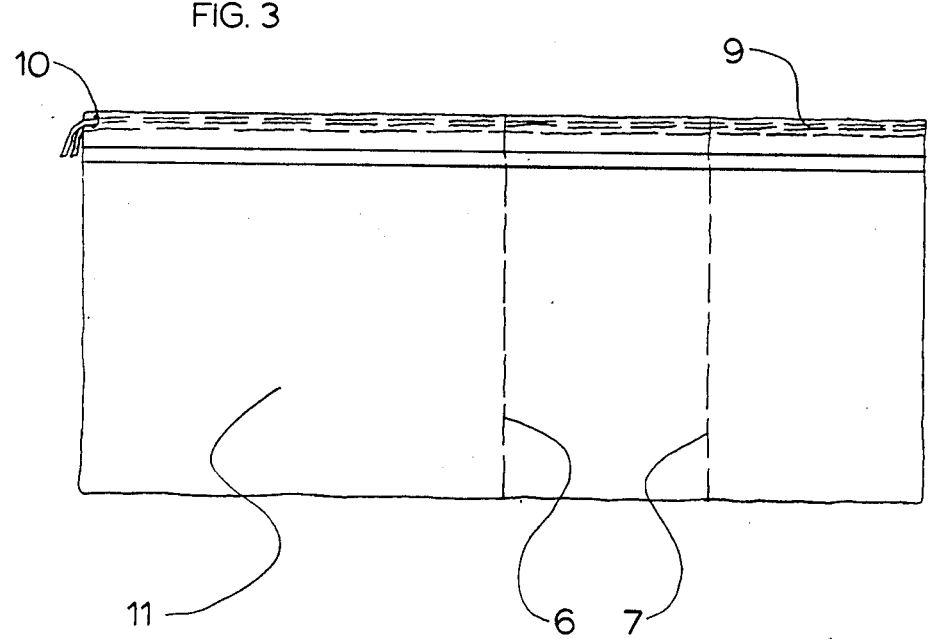
FIG. 3 is a profile view of the liner as viewed from the front.

FIGS. 2 and 3 show a plan and profile view, respectively of the invention illustrating the compartments formed from separating walls 6, 7 in liner 11. More in particularly shown is one means of closure provided by a flat tying strip 9 made of flexible material positioned near the top of the liner. The strip 9 passes through a panel of the liner and upon meeting itself at a corner the two free ends of the strip 9 pass through a single pair of openings 10 leaving it available for closure.

The drawing of said free ends of strip 9 will result in a constriction of the mouth of the liner. The free ends may then be tied together providing support for the constriction.

It is understood that the flexible material forming liner 11 may be of variable thicknesses to meet a variety of needs. It is further understood that the flexible material may be manufactured in a variety of densities utilizing many extruded films, some being polyvinyl chloride, polyethylene and the like. It is further understood that any number of separating internal walls may or may not be manufactured in the liner.

It is to be appreciated that this invention can be manufactured in different sizes suiting different container dimensions and methods of closure. Therefore, it is to be construed and limited only by the claim which follows.

I claim:

1. A rigid insulated cooler and a nonselfsupporting, removable liner therefor, said liner comprising: a flexible, water impermeable material having a plurality of sides and a bottom integrally connected to said sides, forming said liner with an open mouth, and at least one interior wall of said flexible, water impermeable material integrally connecting two sides and said bottom of the liner to form separate, noncommunicating compartments within the liner whereby items can be stored separately and conveniently, said liner being provided with a means of attachment to said rigid insulated cooler, and said liner being provided with a means of closure of the open mouth.

* * * * *